(12) United States Patent
Anselmann et al.

(10) Patent No.: US 7,241,502 B2
(45) Date of Patent: Jul. 10, 2007

(54) MOULDED BODIES CONSISTING OF CORE-SHELL PARTICLES

(75) Inventors: Ralf Anselmann, Ramsen (DE); Holger Winkler, Darmstadt (DE); G. P. Hellmann, Mainz (DE); Tillmann Ruhl, Griesheim (DE); Günther Vulpius, Riedsladt (DE); Harald Dörr, Messel (DE)

(73) Assignee: Merck Patentgesellschaft, Darmstadt (DE)

( * ) Notice: Subject to any disclaimer, the term of this patent is extended or adjusted under 35 U.S.C. 154(b) by 0 days.

(21) Appl. No.: 10/489,419

(22) PCT Filed: Aug. 21, 2002

(86) PCT No.: PCT/EP02/09324

§ 371 (c)(1),
(2), (4) Date: Mar. 12, 2004

(87) PCT Pub. No.: WO03/025035

PCT Pub. Date: Mar. 27, 2003

(65) Prior Publication Data

US 2004/0253443 A1 Dec. 16, 2004

(30) Foreign Application Priority Data

Sep. 14, 2001 (DE) ............................... 101 45 450
Jun. 25, 2002 (DE) ............................... 102 28 228

(51) Int. Cl.
*B32B 5/16* (2006.01)
(52) U.S. Cl. ..................... 428/403; 428/407; 428/570; 428/323
(58) Field of Classification Search ................ 428/403, 428/407, 570, 323
See application file for complete search history.

(56) References Cited

U.S. PATENT DOCUMENTS

| 3,138,475 | A | 6/1964 | Schröder et al. |
| 3,258,349 | A | 6/1966 | Scott |
| 3,497,367 | A | 2/1970 | Gaskin et al. |
| 4,391,928 | A | 7/1983 | Herman et al. |
| 4,608,307 | A | 8/1986 | Nakano et al. |
| 4,703,020 | A | 10/1987 | Nakano et al. |
| 4,911,903 | A | 3/1990 | Unger et al. |

(Continued)

FOREIGN PATENT DOCUMENTS

DE 10145450.3 9/2001

(Continued)

OTHER PUBLICATIONS

Chemical Abstracts, Bd. 116, Nr. 10, Mar. 9, 1992, Columbus, Ohio, seite 399.

*Primary Examiner*—H. Thi Le
(74) *Attorney, Agent, or Firm*—Millen, White, Zelano & Branigan, P.C.

(57) ABSTRACT

The invention relates to mouldings having an optical effect which essentially consist of core/shell particles whose shell forms a matrix and whose core is essentially solid and has an essentially monodisperse size distribution, where a difference exists between the refractive indices of the core material and of the shell material. The mouldings are characterized in that they are obtainable by a process in which the core/shell particles are heated to a temperature at which the shell is flowable, and the flowable core/shell particles are subjected to the action of a mechanical force.

30 Claims, 5 Drawing Sheets

U.S. PATENT DOCUMENTS

Figure 1:
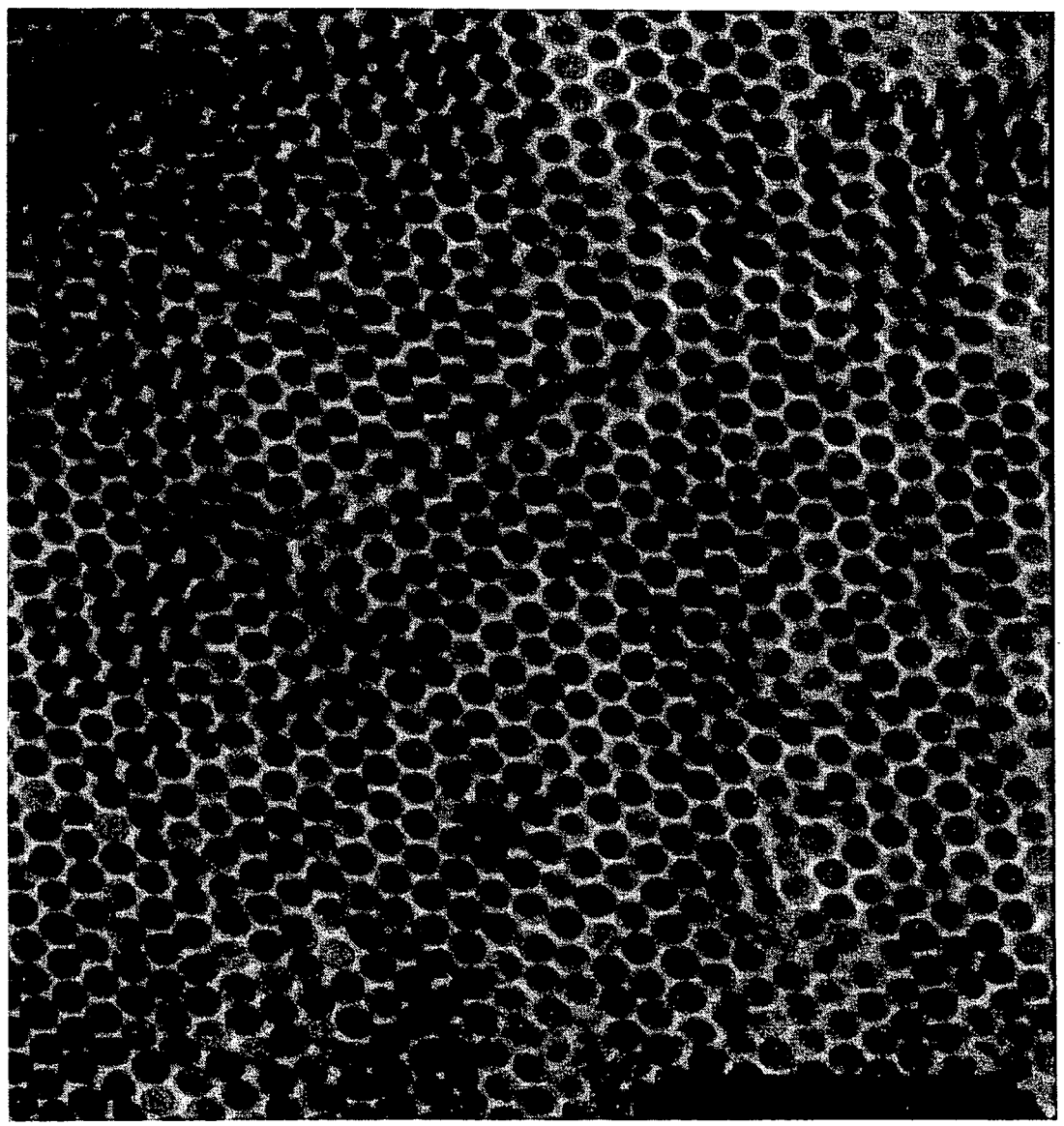

| | | | |
|---|---|---|---|
| 5,026,782 A | 6/1991 | Biale | |
| 5,053,441 A | 10/1991 | Biale | |
| 5,206,299 A * | 4/1993 | Oshima et al. | 525/305 |
| 5,273,824 A | 12/1993 | Hoshino et al. | |
| 5,337,131 A | 8/1994 | Sagiv et al. | |
| 5,344,489 A | 9/1994 | Matijevic et al. | |
| 5,618,872 A | 4/1997 | Pohl et al. | |
| 5,756,211 A * | 5/1998 | Ittmann et al. | 428/409 |
| 5,846,310 A | 12/1998 | Noguchi et al. | |
| 5,932,309 A | 8/1999 | Smith et al. | |
| 6,254,831 B1 | 7/2001 | Barnard et al. | |
| 6,276,214 B1 | 8/2001 | Kimura et al. | |
| 6,303,055 B1 | 10/2001 | Yamada et al. | |
| 6,337,131 B1 * | 1/2002 | Rupaner et al. | 428/403 |
| 6,599,631 B2 * | 7/2003 | Kambe et al. | 428/447 |
| 6,689,832 B1 * | 2/2004 | Rostami | 524/423 |
| 6,751,022 B2 | 6/2004 | Phillips | |
| 6,756,115 B2 | 6/2004 | Fu et al. | |
| 6,756,120 B2 * | 6/2004 | Smith et al. | 428/404 |
| 6,780,647 B2 | 8/2004 | Fujiwara et al. | |
| 6,818,051 B2 | 11/2004 | Anselmann et al. | |
| 6,841,238 B2 | 1/2005 | Argoitia et al. | |
| 6,858,301 B2 * | 2/2005 | Ganapathiappan | 428/407 |
| 6,863,847 B2 | 3/2005 | Fu et al. | |
| 6,875,808 B2 | 4/2005 | Weier et al. | |
| 6,881,787 B2 | 4/2005 | Weier et al. | |
| 6,939,605 B2 * | 9/2005 | Frese et al. | 428/327 |
| 2001/0019037 A1 | 9/2001 | Zakhidov et al. | |
| 2003/0116062 A1 | 6/2003 | Anselmann et al. | |
| 2004/0253443 A1 | 12/2004 | Anselmann et al. | |
| 2004/0262790 A1 | 12/2004 | Fu et al. | |
| 2005/0142343 A1 | 6/2005 | Winkler et al. | |
| 2005/0145037 A1 | 7/2005 | Winkler et al. | |
| 2005/0228072 A1 | 10/2005 | Winkler et al. | |
| 2006/0002875 A1 | 1/2006 | Winkler et al. | |

FOREIGN PATENT DOCUMENTS

| | | |
|---|---|---|
| DE | 102 04 338 | 2/2002 |
| EP | 0 141 388 A2 | 5/1985 |
| EP | 0469336 | 7/1991 |
| EP | 0441559 | 8/1991 |
| EP | 0644914 | 3/1995 |
| EP | 0955323 | 11/1999 |
| EP | 1 285 031 | 6/2003 |
| JP | 03 257081 | 11/1991 |
| WO | WO 93/08237 | 4/1993 |
| WO | WO 0012960 | 3/2000 |
| WO | WO 00/21905 | 4/2000 |
| WO | WO 01/86038 | 11/2001 |
| WO | WO 01/88044 | 11/2001 |
| WO | WO 03/025035 | 3/2003 |

* cited by examiner

MOULDED BODIES CONSISTING OF CORE-SHELL PARTICLES

The invention relates to mouldings having an optical effect which essentially consist of core/shell particles, to the core/shell particles, and to processes for the production of the mouldings or core/shell particles.

Polymeric core/shell particles have been recommended for the production of adhesives, binder systems, in particular also as reinforcing materials in the production of certain groups of composite materials. Composite materials of this type consist of a plastic matrix and reinforcing elements embedded therein. One problem in the production of materials of this type consists in the production of a positive connection between the matrix material and reinforcing material. Only if such a connection exists can forces be transferred from the matrix to the reinforcing elements. The more the mechanical properties of the matrix material and reinforcing material, in particular with respect to elasticity, hardness and deformability, differ from one another, the greater the risk of detachment of the matrix from the reinforcing elements. This risk is countered by coating the polymeric reinforcing particles with a second polymer material which is more similar to the matrix material and is therefore able to form a stronger bond to the matrix (Young-Sam Kim, "Synthesis and Characterisation of Multiphase Polymeric Lattices Having a Core/Shell Morphology", dissertation, University of Karlsruhe (TH), Shaker Verlag, Aachen (1993), pages 2-22). In addition, it has also been recommended to graft the coating polymer onto the reinforcing polymer in order also to prevent detachment of the shell from the reinforcing particles by means of covalent bonds (W.-M. Billig-Peters, "Core/Shell Polymers with the Aid of Polymeric Azo Initiators", dissertation, University of Bayreuth (1991).

The specific production of core/shell polymers is generally carried out by stepwise emulsion polymerisation, in which firstly a latex of core particles is produced in the first step, and the shell polymer is produced in the second step. In this process, the core particles act as "seed particles", onto the surface of which the shell polymers are preferably deposited.

The deposition may result in a more or less symmetrical shell around core particles, but it is also possible for irregular depositions to take place, giving structures having a blackberry-like appearance. A good review of the production of two-phase polymer particles and the phenomena which occur in the process, in particular the formation of core/shell particles, is given in the dissertation by Katharina Landfester, "Synthesis and Characterisation of Core/Shell Lattices Using Electron Microscopy and Solid-State NMR", University of Mainz (1995).

Natural precious opals are built up from domains consisting of monodisperse, closely packed and therefore regularly arranged silica gel spheres having diameters of 150-400 nm. The colour play of these opals is created by Bragg-like scattering of the incident light at the lattice planes of the domains arranged in a crystal-like manner.

There has been no lack of attempts to synthesise white and black opals for jewellery purposes using water-glass or silicone esters as starting material.

U.S. Pat. No. 4,703,020 describes a process for the production of a decorative material consisting of amorphous silica spheres which are arranged in a three-dimensional manner, with zirconium oxide or zirconium hydroxide being located in the interspaces between the spheres. The spheres have a diameter of 150-400 nm. The production is carried out in two steps. In a first step, silicon dioxide spheres are allowed to sediment from an aqueous suspension. The resultant material is then dried in air and subsequently calcined at 800° C. In a second step, the calcined material is introduced into the solution of a zirconium alkoxide, the alkoxide penetrating into the interspaces between the cores, and zirconium oxide being precipitated by hydrolysis. This material is subsequently calcined at 1000-1300° C.

U.S. Pat. No. 4,434,010 discloses inorganic-based pigments which have a highly pronounced colour flop. These pigments are characterized by an extremely homogeneous structure comprising layers having different refractive indices. This structure results in pronounced interference effects, which are utilised for the generation of colour. However, the production of these pigments is difficult and only possible by means of complex and expensive production processes.

U.S. Pat. No. 5,364,557 discloses organic effect pigments based on cholesteric liquids. In these pigments, an interference effect arises due to a helical superstructure. Here too, the materials necessary for the production are complicated to produce and therefore very expensive. The pigments are produced from the cholesteric liquid crystals (LCs) by applying the cholesteric material in a thin layer to a support foil, carrying out a photochemical polymerisation in the LC phase, and detaching the resultant film from the foil and grinding it. Besides the expensive production of the starting materials, a severe disadvantage of this process is that extremely great attention must be paid to alignment of the LCs during the production process since this can be adversely affected by even extremely small amounts of impurities.

A process for the coating and printing of substrates in which cholesteric liquid crystals are used is disclosed in WO 96/02597. In this process, one or more liquid-crystalline compounds, at least one of which is chiral, and which contain one or two polymerisable groups, are applied to a substrate together with suitable comonomers—if this is carried out by a printing process, dispersants are also added to the mixture—and copolymerised. The resultant layers can, if they are brittle, be detached from the substrate, comminuted and used as pigments.

Furthermore, aqueous, monodisperse polymer dispersions are known, for example from T. Okubu, Prog. Polym. Sci. 18 (1993) 481-517, which, in liquid form, if necessary after post-purification, tend toward latex crystallisation and thus result in colour effects.

A multiplicity of publications on the production of monodisperse particles is known, for example EP-A-0 639 590 (production by precipitation polymerisation), A. Rudin, J. Polym. Sci., 33 (1995) 1849-1857 (monodisperse particles having a core/shell structure) and EP-A-0 292 261 (production with addition of seed particles).

EP-A-0 441 559 describes core/shell polymers having different refractive indices of core and shell and the use of these materials as additives for paper-coating compositions.

EP-A-0 955 323 describes core/shell particles whose core and shell materials are able to form a two-phase system and which are characterized in that the shell material is filmable and the cores are essentially dimensionally stable under the conditions of film formation of the shell, are only swellable by the shell material to a very small extent, or not at all, and have a monodisperse size distribution, with a difference between the refractive indices of the core material and of the shell material of at least 0.001. The production of the core/shell particles and their use for the production of effect colorants are also described. The process for the production of an effect colorant comprises the following steps:

Application of the core/shell particles to a substrate of low adhesive capacity, if necessary evaporation or expulsion of any solvent or diluent present in the applied layer, transfer of the shell material of the core/shell particles into a liquid, soft or visco-elastic matrix phase, orientation of the cores of the core/shell particles at least to form domains having a regular structure, curing of the shell material in order to fix the regular core structure, detachment of the cured film from the substrate, and, if a pigment or powder is to be produced, comminution of the detached film to the desired particle size. In these core/shell particles disclosed in EP-A-0 955 323, the core "floats" in the shell matrix; a long-range order of the cores does not form in the melt, merely a close-range order of the cores in domains. These particles are thus of only restricted suitability for processing by the usual methods for polymers.

For industrial applications, however, it would be desirable to be able to produce even large-area structures or three-dimensional mouldings directly with a long-range order of the cores, with the structures or mouldings exhibiting the optical effect homogeneously and very brightly over the entire area.

The object of the present invention was to avoid the above-mentioned disadvantages and to provide mouldings which can be obtained using conventional processing methods.

The present invention therefore relates firstly to mouldings having an optical effect, essentially consisting of core/shell particles whose shell forms a matrix and whose core is essentially solid and has an essentially monodisperse size distribution, where a difference exists between the refractive indices of the core material and of the shell material, characterized in that the mouldings are obtainable by a process in which a) the core/shell particles are heated to a temperature at which the shell is flowable, and b) the flowable core/shell particles are subjected to the action of a mechanical force.

The present invention furthermore relates to a process for the production of mouldings having an optical effect which is characterized in that a) core/shell particles whose shell forms a matrix and whose core is essentially solid and has an essentially monodisperse size distribution, where a difference exists between the refractive indices of the core material and of the shell material, are heated to a temperature at which the shell is flowable, and b) the flowable core/shell particles from a) are subjected to a mechanical force.

For the purposes of the present invention, the term optical effect is taken to mean both effects in the visible wavelength region of light and, for example, effects in the UV or infrared region. It has recently become established practice to refer to such effects in general as photonic effects. All these effects are optical effects for the purposes of the present invention, with the effect, in a preferred embodiment, being opalescence in the visible region. In a conventional definition of the term, the mouldings according to the invention are photonic crystals (cf. Nachrichten aus der Chemie; 49(9), September 2001; pp. 1018-1025).

It is particularly preferred for the purposes of the present invention for the shell in the core/shell particles to be bonded to the core via an interlayer.

It is furthermore preferred for the purposes of the present invention for the core of the core/shell particles to consist of a material which is either not flowable or becomes flowable at a temperature above the melting point of the shell material. This can be achieved through the use of polymeric materials having a correspondingly high glass transition temperature ($T_g$), preferably crosslinked polymers, or through the use of inorganic core materials.

The suitable materials are described below in detail.

In a preferred variant of the production of mouldings according to the invention, the temperature in step a) is at least 40° C., preferably at least 60° C., above the glass transition temperature of the shell of the core/shell particles. It has been found empirically that the flowability of the shell in this temperature range meets the requirements for economical production of the mouldings to a particular extent.

In a likewise preferred process variant which results in the mouldings according to the invention, the flowable core/shell particles are cooled under the action of the mechanical force from b) to a temperature at which the shell is no longer flowable.

For the purposes of the present invention, the action of mechanical force can be the action of a force which occurs in the conventional processing steps of polymers. In preferred variants of the present invention, the action of mechanical force takes place either:

through uniaxial pressing or
action of force during an injection-moulding operation or during a transfer moulding operation,
during (co)extrusion or
during a calendering operation or
during a blowing operation.

If the action of force takes place through uniaxial pressing, the mouldings according to the invention are preferably films. Films according to the invention can preferably also be produced by calendering, film blowing or flat-film extrusion. The various ways of processing polymers under the action of mechanical forces are well known to the person skilled in the art and are revealed, for example, by the standard textbook Adolf Franck, "Kunststoff-Kompendium" [Plastics Compendium]; Vogel-Verlag; 1996.

If mouldings are produced by injection moulding, it is particularly preferred for the demoulding not to take place until after the mould with moulding inside has cooled. When carried out in industry, it is advantageous to employ moulds having a large cooling-channel cross section since the cooling can then take place in a relatively short time. It has been found that cooling in the mould makes the colour effects according to the invention much more intense. It is assumed that better disordering of the core/shell particles to form the lattice occurs in this uniform cooling operation. It is particularly advantageous here for the mould to have been heated before the injection operation.

The mouldings according to the invention may, if it is technically advantageous, comprise auxiliaries and additives here. They can serve for optimum setting of the applicational data or properties desired or necessary for application and processing. Examples of auxiliaries and/or additives of this type are antioxidants, UV stabilisers, biocides, plasticisers, film-formation auxiliaries, flow-control agents, fillers, melting assistants, adhesives, release agents, application auxiliaries, demoulding auxiliaries and viscosity modifiers, for example thickeners.

Particularly recommended are additions of film-formation auxiliaries and film modifiers based on compounds of the general formula $HO-C_nH_{2n}-O-(C_nH_{2n}-O)_mH$, in which n is a number from 2 to 4, preferably 2 or 3, and m is a number from 0 to 500. The number n can vary within the chain, and the various chain members can be incorporated in a random or blockwise distribution. Examples of auxiliaries of this type are ethylene glycol, propylene glycol, di-, tri- and tetraethylene glycol, di-, tri- and tetrapropylene glycol, polyethylene oxides, polypropylene oxide and ethylene oxide-propylene oxide copolymers having molecular weights of up to about 15,000 and a random or block-like distribution of the ethylene oxide and propylene oxide units.

If desired, organic or inorganic solvents, dispersion media or diluents, which, for example, extend the open time of the formulation, i.e. the time available for its application to substrates, waxes or hot-melt adhesives are also possible as additives.

If desired, UV and weathering stabilisers can also be added to the mouldings. Suitable for this purpose are, for example, derivatives of 2,4-dihydroxybenzophenone, derivatives of 2-cyano-3,3'-diphenyl acrylate, derivatives of 2,2',4,4'-tetrahydroxybenzophenone, derivatives of o-hydroxyphenylbenzotriazole, salicylic acid esters, o-hydroxyphenyl-s-triazines or sterically hindered amines. These substances may likewise be employed individually or in the form of a mixture.

The total amount of auxiliaries and/or additives is up to 40% by weight, preferably up to 20% by weight, particularly preferably up to 5% by weight, of the weight of the mouldings. Accordingly, the mouldings consist of at least 60% by weight, preferably at least 80% by weight and particularly preferably at least 95% by weight, of core/shell particles.

In order to achieve the optical or photonic effect according to the invention, it is desirable for the core/shell particles to have a mean particle diameter in the range from about 5 nm to about 2000 nm. It may be particularly preferred here for the core/shell particles to have a mean particle diameter in the range from about 5 to 20 nm, preferably from 5 to 10 nm. In this case, the cores may be known as "quantum dots"; they exhibit the corresponding effects known from the literature. In order to achieve colour effects in the region of visible light, it is particularly advantageous for the core/shell particles to have a mean particle diameter in the region of about 50-500 nm. Particular preference is given to the use of particles in the range 100-500 nm since in particles in this size range (depending on the refractive-index contrast which can be achieved in the photonic structure), the reflections of various wavelengths of visible light differ significantly from one another, and thus the opalescence which is particularly important for optical effects in the visible region occurs to a particularly pronounced extent in a very wide variety of colours. However, it is also preferred in a variant of the present invention to employ multiples of this preferred particle size, which then result in reflections corresponding to the higher orders and thus in a broad colour play.

A further crucial factor for the intensity of the observed effects is the difference between the refractive indices of core and shell. Mouldings according to the invention preferably have a difference between the refractive indices of the core material and of the shell material of at least 0.001, preferably at least 0.01 and particularly preferably at least 0.1.

In a particular embodiment of the invention, further nanoparticles are included in the matrix phase of the mouldings in addition to the cores of the core/shell particles. These particles are selected with respect to their particle size in such a way that they fit into the cavities of the sphere packing of the cores and thus cause only little change in the arrangement of the cores. Through specific selection of corresponding materials and/or the particle size, it is firstly possible to modify the optical effects of the mouldings, for example to increase their intensity. Secondly, it is possible through incorporation of suitable "quantum dots", to functionalise the matrix correspondingly. Preferred materials are inorganic nanoparticles, in particular nanoparticles of metals or of II-VI or III-V semiconductors or of materials which influence the magnetic/electrical (electronic) properties of the materials. Examples of preferred nanoparticles are noble metals, such as silver, gold and platinum, semiconductors or insulators, such as zinc chalcogenides and cadmium chalcogenides, oxides, such as haematite, magnetite or perovskite, or metal pnictides, for example gallium nitride, or mixed phases of these materials.

The precise mechanism which results in the uniform orientation (FIGS. 1 and 2) of the core/shell particles in the mouldings according to the invention was hitherto unknown. However, it has been found that the action of force is essential for the formation of the far-reaching order. As shown in FIG. 3, it is assumed that the elasticity of the shell material under the processing conditions is crucial for the ordering process. The chain ends of the shell polymers generally attempt to adopt a coiled shape. If two particles come too close, the coils are compressed in accordance with the model concept, and repellent forces arise. Since the shell-polymer chains of different particles also interact with one another, the polymer chains are stretched in accordance with the model if two particles move away from one another. Due to the attempts by the shell-polymer chains to re-adopt a coiled shape, a force arises which pulls the particles closer together again. In accordance with the model concept, the far-reaching order of the particles in the moulding (FIGS. 1 and 2) is caused by the interaction of these forces.

Particularly suitable core/shell particles for the production of mouldings according to the invention have proven to be those whose shell is bonded to the core via an interlayer.

Core/shell particles whose core is essentially solid and has an essentially monodisperse size distribution, where a difference exists between the refractive index of the core material and that of the shell material, and whose core consists of a material which is either not flowable or becomes flowable at a temperature above the melting point of the shell material and whose shell is bonded to the core via an interlayer, and the use of such particles for the production of mouldings are therefore further subject-matters of the present invention.

In a preferred embodiment of the invention, the interlayer is a layer of crosslinked or at least partially crosslinked polymers. The crosslinking of the interlayer here can take place via free radicals, for example induced by UV irradiation, or preferably via di- or oligofunctional monomers. Preferred interlayers in this embodiment comprise from 0.01 to 100% by weight, particularly preferably from. 0.25 to 10% by weight, of di- or oligofunctional monomers. Preferred di- or oligofunctional monomers are, in particular, isoprene and allyl methacrylate (ALMA). Such an interlayer of crosslinked or at least partially crosslinked polymers preferably has a thickness in the range from 10 to 20 nm. If the interlayer comes out thicker, the refractive index of the layer is selected so that it corresponds either to the refractive index of the core or to the refractive index of the shell.

If copolymers which, as described above, contain a crosslinkable monomer are employed as interlayer, the person skilled in the art will have absolutely no problems in suitably selecting corresponding copolymerisable monomers. For example, corresponding copolymerisable monomers can be selected from a so-called Q-e-scheme (cf. textbooks on macromolecular chemistry). Thus, monomers such as methyl methacrylate and methyl acrylate can preferably be polymerised with ALMA.

In another, likewise preferred embodiment of the present invention, the shell polymers are grafted directly onto the core via a corresponding functionalisation of the core. The surface functionalisation of the core here forms the interlayer according to the invention. The type of surface functionalisation here depends principally on the material of the core. Silicon dioxide surfaces can, for example, be suitably modified with silanes carrying correspondingly reactive end groups, such as epoxy functions or free double bonds. Other surface functionalisations, for example for metal oxides, can be titanates or organoaluminium compounds, each containing organic side chains with corresponding functions. In the case of polymeric cores, the surface modification can be carried out, for example, using a styrene which is functionalised on the aromatic ring, such as bromostyrene. This functionalisation then allows growing-on of the shell polymers to be achieved. In particular, the interlayer can also effect adhesion of the shell to the core via ionic interactions or complex bonds.

In a preferred embodiment, the shell of these core/shell particles essentially consists of uncrosslinked organic polymers, which are preferably grafted onto the core via an at least partially crosslinked interlayer.

The shell here can consist either of thermoplastic or elastomeric polymers. Since the shell essentially determines the material properties and processing conditions of the core/shell particles, the person skilled in the art will select the shell material in accordance with the usual considerations in polymer technology. In particular if movements or stresses in a material are to result in optical effects, the use of elastomers as shell material is preferred. In mouldings according to the invention, the separations between the cores are changed by such movements. The wavelengths of the interacting light and the effects to be observed change correspondingly.

The core can consist of a very wide variety of materials. The essential factor according to the invention is, as already stated, that a refractive-index difference to the shell exists and the core remains solid under the processing conditions.

It is furthermore particularly preferred in a variant of the invention for the core to consist of an organic polymer, which is preferably crosslinked.

In another, likewise preferred variant of the invention, the core consists of an inorganic material, preferably a metal or semimetal or a metal chalcogenide or metal pnictide. For the purposes of the present invention, chalcogenides are taken to mean compounds in which an element from group 16 of the Periodic Table of the Elements is the electronegative bonding partner; pnictides are taken to mean those in which an element from group 15 of the Periodic Table of the Elements is the electronegative bonding partner.

Preferred cores consist of metal chalcogenides, preferably metal oxides, or metal pnictides, preferably nitrides or phosphides. Metals in the sense of these terms are all elements which can occur as electropositive partner compared with the counterions, such as the classical metals of the sub-groups, or the main-group metals from the first and second main groups, but also all elements from the third main group, as well as silicon, germanium, tin, lead, phosphorus, arsenic, antimony and bismuth. The preferred metal chalcogenides and metal pnictides include, in particular, silicon dioxide, aluminium oxide, gallium nitride, boron nitride, aluminium nitride, silicon nitride and phosphorus nitride.

The starting materials employed for the production of the core/shell particles according to the invention in a variant of the present invention are preferably monodisperse cores of silicon dioxide, which can be obtained, for example, by the process described in U.S. Pat. No. 4,911,903. The cores here are produced by hydrolytic polycondensation of tetraalkoxysilanes in an aqueous-ammoniacal medium, where firstly a sol of primary particles is produced, and the resultant $SiO_2$ particles are subsequently converted into the desired particle size by continuous, controlled metered addition of tetraalkoxysilane. This process enables the production of monodisperse $SiO_2$ cores having mean particle diameters of between 0.05 and 10 μm with a standard deviation of 5%.

Also preferred as starting material are $SiO_2$ cores which have been coated with (semi)metals or metal oxides which do not absorb in the visible region, such as, for example, $TiO_2$, $ZrO_2$, $ZnO_2$, $SnO_2$ or $Al_2O_3$. The production of $SiO_2$ cores coated with metal oxides is described in greater detail in, for example, U.S. Pat. No. 5,846,310, DE 198 42 134 and DE 199 29 109.

The starting material employed can also be monodisperse cores of nonabsorbent metal oxides, such as $TiO_2$, $ZrO_2$, $ZnO_2$, $SnO_2$ or $Al_2O_3$, or metal-oxide mixtures. Their production is described, for example, in EP 0 644 914. Furthermore, the process of EP 0 216 278 for the production of monodisperse $SiO_2$ cores can readily be applied to other oxides with the same result. Tetraethoxysilane, tetrabutoxytitanium, tetrapropoxyzirconium or mixtures thereof are added in one portion, with vigorous mixing, to a mixture of alcohol, water and ammonia, whose temperature is set precisely to from 30 to 40° C. using a thermostat, and the resultant mixture is stirred vigorously for a further 20 seconds, giving a suspension of monodisperse cores in the nanometre region. After a post-reaction time of from 1 to 2 hours, the cores are separated off in a conventional manner, for example by centrifugation, washed and dried.

Suitable starting materials for the production of the core/shell particles according to the invention are furthermore also monodisperse cores of polymers which contain included particles, for example metal oxides. Materials of this type are available, for example, from micro caps Entwicklungs-und Vertriebs GmbH in Rostock. Microencapsulations based on polyesters, polyamides and natural and modified carbohydrates are produced in accordance with customer-specific requirements.

It is furthermore possible to employ monodisperse cores of metal oxides which have been coated with organic materials, for example silanes. The monodisperse cores are dispersed in alcohols and modified with conventional organoalkoxysilanes. The silanisation of spherical oxide particles is also described in DE 43 16 814. The silanes here preferably form the above-mentioned interlayer.

For the intended use of the core/shell particles according to the invention for the production of mouldings, it is important that the shell material is filmable, i.e. that it can be softened, visco-elastically plasticised or liquefied by simple measures to such an extent that the cores of the core/shell particles are at least able to form domains having a regular arrangement. The regularly arranged cores in the matrix formed by film formation of the shell of the core/shell particles form a diffraction grating, which causes interference phenomena and thus results in very interesting colour effects.

The materials of core and shell may, as long as they satisfy the conditions indicated above, be of an inorganic, organic or even metallic character or they may be hybrid materials.

In view of the possibility of varying the invention-relevant properties of the cores of the core/shell particles according to the invention as needed, however, it is often advantageous for the cores to comprise one or more polymers and/or copolymers (core polymers) or to consist of polymers of this type.

The cores preferably comprise a single polymer or copolymer. For the same reason, it is advantageous for the shell of the core/shell particles according to the invention likewise to comprise one or more polymers and/or copolymers (shell polymers; matrix polymers) or polymer precursors and, if desired, auxiliaries and additives, where the composition of the shell may be selected in such a way that it is essentially dimensionally stable and tack-free in a non-swelling environment at room temperature.

With the use of polymer substances as shell material and, if desired, core material, the person skilled in the art gains the freedom to determine their relevant properties, such as, for example, their composition, the particle size, the mechanical data, the refractive index, the glass transition temperature, the melting point and the core:shell weight ratio and thus also the applicational properties of the core/shell particles, which ultimately also affect the properties of the mouldings produced therefrom.

Polymers and/or copolymers which may be present in the core material or of which it consists are high-molecular-weight compounds which conform to the specification given above for the core material. Both polymers and copolymers of polymerisable unsaturated monomers and polycondensates and copolycondensates of monomers containing at least two reactive groups, such as, for example, high-molecular-weight aliphatic, aliphatic/aromatic or fully aromatic polyesters, polyamides, polycarbonates, polyureas and polyurethanes, but also amino and phenolic resins, such as, for example, melamine-formaldehyde, urea-formaldehyde and phenol-formaldehyde condensates, are suitable.

For the production of epoxy resins, which are likewise suitable as core material, epoxide prepolymers, which are obtained, for example, by reaction of bisphenol A or other bisphenols, resorcinol, hydroquinone, hexanediol or other aromatic or aliphatic diols or polyols, or phenol-formaldehyde condensates, or mixtures thereof with one another, with epichlorohydrin or other di- or polyepoxides, are usually mixed with further condensation-capable compounds directly or in solution and allowed to cure.

The polymers of the core material are advantageously, in a preferred variant of the invention, crosslinked (co)polymers, since these usually only exhibit their glass transition at high temperatures. These crosslinked polymers; may either already have been crosslinked during the polymerisation or polycondensation or copolymerisation or copolycondensation or may have been post-crosslinked in a separate process step after the actual (co)polymerisation or (co)polycondensation.

A detailed description of the chemical composition of suitable polymers follows below.

In principle, polymers of the classes already mentioned above, if they are selected or constructed in such a way that they conform to the specification given above for the shell polymers, are suitable for the shell material and for the core material.

For certain applications, such as, for example, for the production of coatings or coloured films, it is favourable, as already stated above, for the polymer material of the matrix phase-forming shell of the core/shell particles according to the invention to be an elastically deformable polymer, for example a polymer having a low glass transition temperature. In this case, it is possible to achieve a situation in which the colour of the moulding according to the invention varies on elongation and compression. Also of interest for the application are core/shell particles according to the invention which, on film formation, result in mouldings which exhibit dichroism.

Polymers which meet the specifications for a shell material are likewise present in the groups of polymers and copolymers of polymerisable unsaturated monomers and polycondensates and copolycondensates of monomers containing at least two reactive groups, such as, for example, high-molecular-weight aliphatic, aliphatic/aromatic or fully aromatic polyesters and polyamides.

Taking into account the above conditions for the properties of the shell polymers (=matrix polymers), selected units from all groups of organic film formers are in principle suitable for their production.

Some further examples are intended to illustrate the broad range of polymers which are suitable for the production of the shells.

If the shell is intended to have a comparatively low refractive index, polymers such as polyethylene, polypropylene, polyethylene oxide, polyacrylates, polymethacrylates, polybutadiene, polymethyl methacrylate, polytetrafluoroethylene, polyoxymethylene, polyesters, polyamides, polyepoxides, polyurethane, rubber, polyacrylonitrile and polyisoprene, for example, are suitable.

If the shell is intended to have a comparatively high refractive index, polymers having a preferably aromatic basic structure, such as polystyrene, polystyrene copolymers, such as, for example, SAN, aromatic-aliphatic polyesters and polyamides, aromatic polysulfones and polyketones, polyvinyl chloride, polyvinylidene chloride and, on suitable selection of a high-refractive-index core material, also polyacrylonitrile or polyurethane, for example, are suitable for the shell.

In an embodiment of core/shell particles which is particularly preferred in accordance with the invention, the core consists of crosslinked polystyrene and the shell of a polyacrylate, preferably polyethyl acrylate, polybutyl acrylate, polymethyl methacrylate and/or a copolymer thereof.

With respect to particle size, particle-size distribution and refractive-index differences, the above-stated regarding the mouldings applies analogously to the core/shell particles according to the invention.

With respect to the processability of the core/shell particles into mouldings, it is advantageous for the core:shell weight ratio to be in the range from 2:1 to 1:5, preferably in the range from 3:2 to 1:3 and particularly preferably in the region below 1.2:1. In specific embodiments of the present invention, it is even preferred for the core:shell weight ratio to be less than 1:1, a typical upper limit for the shell content being at a core:shell weight ratio of 2:3.

The core/shell particles according to the invention can be produced by various processes. A preferred way of obtaining the particles is a further subject-matter of the present invention. This is a process for the production of core/shell particles by a) surface treatment of monodisperse cores, and b) application of the shell of organic polymers to the treated cores.

In a process variant, the monodisperse cores are obtained in step a) by emulsion polymerisation.

In a preferred variant of the invention, a crosslinked polymeric interlayer, which preferably contains reactive centres to which the shell can be covalently bonded, is applied to the cores in step a), preferably by emulsion polymerisation or by ATR polymerisation. ATR polymerisation here stands for atom transfer radical polymerisation, as described, for example, in K. Matjaszewski, Practical Atom Transfer Radical Polymerisation, Polym. Mater. Sci. Eng. 2001, 84. The encapsulation of inorganic materials by means of ATRP is described, for example, in T. Werne, T. E. Patten, Atom Transfer Radical Polymerisation from Nanoparticles: A Tool for the Preparation of Well-Defined Hybrid Nanostructures and for Understanding the Chemistry of Controlled/"Living" Radical Polymerisation from Surfaces, J. Am. Chem. Soc. 2001, 123, 7497-7505 and WO 00/11043. The performance both of this method and of emulsion polymerisations is familiar to the person skilled in the art of polymer preparation and is described, for example, in the above-mentioned literature references.

The liquid reaction medium in which the polymerisations or copolymerisations can be carried out consists of the solvents, dispersion media or diluents usually employed in polymerisations, in particular in emulsion polymerisation processes. The choice here is made in such a way that the emulsifiers employed for homogenisation of the core particles and shell precursors are able to develop adequate efficacy. Suitable liquid reaction media for carrying out the process according to the invention are aqueous media, in particular water.

Suitable for initiation of the polymerisation are, for example, polymerisation initiators which decompose either thermally or photochemically, form free radicals and thus initiate the polymerisation. Preferred thermally activatable polymerisation initiators here are those which decompose at between 20 and 180° C., in particular at between 20 and 80° C. Particularly preferred polymerisation initiators are peroxides, such as dibenzoyl peroxide, di-tertbutyl peroxide, peresters, percarbonates, perketals, hydroperoxides, but also inorganic peroxides, such as $H_2O_2$, salts of peroxosulfuric acid and peroxodisulfuric acid, azo compounds, alkylboron compounds, and hydrocarbons which decompose homolytically. The initiators and/or photoinitiators, which, depending on the requirements of the polymerised material, are employed in amounts of between 0.01 and 15% by weight, based on the polymerisable components, can be used individually or, in order to utilise advantageous synergistic effects, in combination with one another. In addition, use is made of redox systems, such as, for example, salts of peroxodisulfuric acid and peroxosulfuric acid in combination with low-valency sulfur compounds, particularly ammonium peroxodisulfate in combination with sodium dithionite.

Corresponding processes have also been described for the production of polycondensation products. Thus, it is possible for the starting materials for the production of polycondensation products to be dispersed in inert liquids and condensed, preferably with removal of low-molecular-weight reaction products, such as water or—for example on use of di(lower alkyl) dicarboxylates for the preparation of polyesters or polyamides—lower alkanols.

Polyaddition products are obtained analogously by reaction of compounds which contain at least two, preferably three, reactive groups, such as, for example, epoxide, cyanate, isocyanate or isothiocyanate groups, with compounds carrying complementary reactive groups. Thus, isocyanates react, for example, with alcohols to give urethanes, with amines to give urea derivatives, while epoxides react with these complementary groups to give hydroxyethers or hydroxyamines. Like the polycondensations, polyaddition reactions can also advantageously be carried out in an inert solvent or dispersion medium.

It is also possible for aromatic, aliphatic or mixed aromatic/aliphatic polymers, for example polyesters, polyurethanes, polyamides, polyureas, polyepoxides or also solution polymers, to be dispersed or emulsified (secondary dispersion) in a dispersion medium, such as, for example, in water, alcohols, tetrahydrofuran or hydrocarbons, and to be post-condensed, crosslinked and cured in this fine distribution.

The stable dispersions required for these polymerisation, polycondensation or polyaddition processes are generally produced using dispersion auxiliaries.

The dispersion auxiliaries used are preferably water-soluble, high-molecular-weight organic compounds having polar groups, such as polyvinylpyrrolidone, copolymers of vinyl propionate or acetate and vinylpyrrolidone, partially saponified copolymers of an acrylate and acrylonitrile, polyvinyl alcohols having different residual acetate contents, cellulose ethers, gelatin, block copolymers, modified starch, low-molecular-weight polymers containing carboxyl and/or sulfonyl groups, or mixtures of these substances.

Particularly preferred protective colloids are polyvinyl alcohols having a residual acetate content of less than 35 mol %, in particular from 5 to 39 mol %, and/or vinylpyrrolidone-vinyl propionate copolymers having a vinyl ester content of less than 35% by weight, in particular from 5 to 30% by weight.

It is possible to use nonionic or ionic emulsifiers, if desired also as a mixture. Preferred emulsifiers are optionally ethoxylated or propoxylated, relatively long-chain alkanols or alkylphenols having different degrees of ethoxylation or propoxylation (for example adducts with from 0 to 50 mol of alkylene oxide) or neutralised, sulfated, sulfonated or phosphated derivatives thereof. Neutralised dialkylsulfosuccinic acid esters or alkyldiphenyl oxide disulfonates are also particularly suitable.

Particularly advantageous are combinations of these emulsifiers with the above-mentioned protective colloids, since particularly finely divided dispersions are obtained therewith.

Special processes for the production of monodisperse polymer particles have also already been described in the literature (for example R. C. Backus, R. C. Williams, J. Appl. Physics 19, p. 1186 (1948)) and can advantageously be employed, in particular, for the production of the cores. It need merely be ensured here that the above-mentioned particle sizes are observed. A further aim is the greatest possible uniformity of the polymers. The particle size in particular can be set via the choice of suitable emulsifiers and/or protective colloids or corresponding amounts of these compounds.

Through the setting of the reaction conditions, such as temperature, pressure, reaction duration and use of suitable catalyst systems, which influence the degree of polymerisation in a known manner, and the choice of the monomers employed for their production—in terms of type and proportion—the desired property combinations of the requisite polymers can be set specifically. The particle size here can be set, for example, through the choice and amount of the initiators and other parameters, such as the reaction temperature. The corresponding setting of these parameters does not present any difficulties at all to the person skilled in the art in the area of polymerisation.

Monomers which result in polymers having a high refractive index are generally those which contain aromatic moieties or those which contain heteroatoms having a high atomic number, such as, for example, those halogen atoms, in particular bromine or iodine atoms, sulfur or metal ions, i.e. atoms or atomic groups which increase the polarisability of the polymers.

Polymers having a low refractive index are accordingly obtained from monomers or monomer mixtures which do not contain the said moieties and/or atoms of high atomic number or only do so in a small proportion.

A review of the refractive indices of various common homopolymers is given, for example, in Ullmanns Encyklopädie der technischen Chemie [Ullmann's Encyclopaedia of Industrial Chemistry], 5th Edition, Volume A21, page 169. Examples of monomers which can be polymerised by means of free radicals and result in polymers having a high refractive index are:

Group a): styrene, styrenes which are alkyl-substituted on the phenyl ring, α-methylstyrene, mono- and dichlorostyrene, vinylnaphthalene, isopropenyinaphthalene, isopropenylbiphenyl, vinylpyridine, isopropenylpyridine, vinylcarbazole, vinylanthracene, N-benzylmethacrylamide and p-hydroxymethacrylanilide.

Group b): acrylates containing aromatic side chains, such as, for example, phenyl (meth)acrylate (=abbreviated notation for the two compounds phenyl acrylate and phenyl methacrylate), phenyl vinyl ether, benzyl (meth)acrylate, benzyl vinyl ether, and compounds of the formulae:

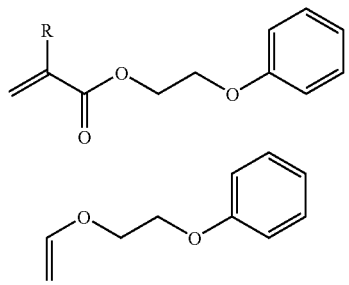

In order to improve clarity and simplify the notation of carbon chains in the formulae above and below, only the bonds between the carbon atoms are shown. This notation corresponds to the depiction of aromatic cyclic compounds, where, for example, benzene is depicted by a hexagon with alternating single and double bonds.

Also suitable are compounds containing sulfur bridges instead of oxygen bridges, such as, for example:

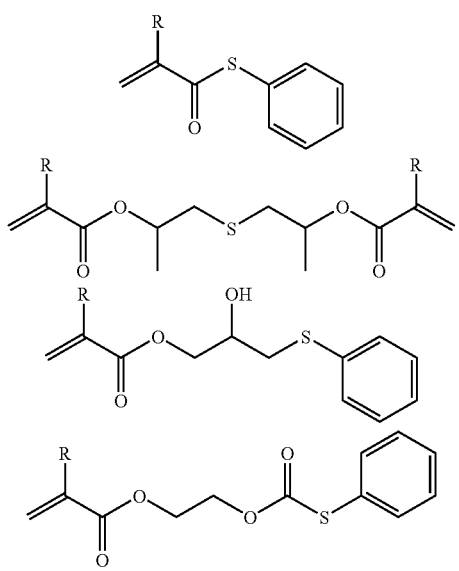

In the above formulae, R is hydrogen or methyl. The phenyl rings in these monomers may carry further substituents. Such substituents are suitable for modifying the properties of the polymers produced from these monomers within certain limits. They can therefore be used in a targeted manner to optimise, in particular, the applicationally relevant properties of the mouldings according to the invention.

Suitable substituents are, in particular, halogen, $NO_2$, alkyl groups having from one to twenty carbon atoms, preferably methyl, alkoxides having from one to twenty carbon atoms, carboxyalkyl groups having from one to twenty carbon atoms, carbonylalkyl groups having from one to twenty carbon atoms or —OCOO-alkyl groups having from one to twenty carbon atoms. The alkyl chains in these radicals may themselves optionally be substituted or interrupted by divalent heteroatoms or groups, such as, for example, —O—, —S—, —NH—, —COO—, —OCO— or —OCOO—, in non-adjacent positions.

Group c): monomers containing heteroatoms, such as, for example, vinyl chloride, acrylonitrile, methacrylonitrile, acrylic acid, methacrylic acid, acrylamide and methacrylamide, or organometallic compounds, such as, for example,

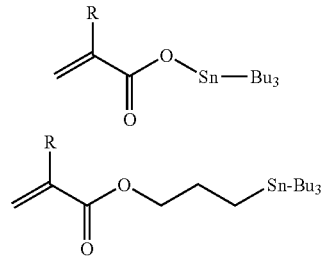

Group d): an increase in the refractive index of the polymers is also achieved by copolymerisation of carboxyl-containing monomers and conversion of the resultant "acidic" polymers into the corresponding salts with metals of relatively high atomic weight, such as, for example, preferably with K, Ca, Sr, Ba, Zn, Pb, Fe, Ni, Co, Cr, Cu, Mn, Sn or Cd.

The above-mentioned monomers, which make a considerable contribution towards the refractive index of the polymers produced therefrom, can be homopolymerised or copolymerised with one another. They can also be copolymerised with a certain proportion of monomers which make a lesser contribution towards the refractive index. Such copolymerisable monomers having a lower refractive index contribution are, for example, acrylates, methacrylates, vinyl ethers or vinyl esters containing purely aliphatic radicals.

In addition, crosslinking agents which can be employed for the production of crosslinked polymer cores from polymers produced by means of free radicals are also all bifunctional or polyfunctional compounds which are copolymerisable with the above-mentioned monomers or which can subsequently react with the polymers with crosslinking.

Examples of suitable crosslinking agents are presented below, divided into groups for systematisation:

Group 1: bisacrylates, bismethacrylates and bisvinyl ethers of aromatic or aliphatic di- or polyhydroxyl compounds, in particular of butanediol (butanediol di(meth)acrylate, butanediol bisvinyl ether), hexanediol (hexanediol di(meth)acrylate, hexanediol bisvinyl ether), pentaerythritol, hydroquinone, bishydroxyphenylmethane, bishydroxyphenyl ether, bishydroxymethylbenzene, bisphenol A or with ethylene oxide spacers, propylene oxide spacers or mixed ethylene oxide/propylene oxide spacers.

Further crosslinking agents from this group are, for example, di- or polyvinyl compounds, such as divinylbenzene, or methylenebisacrylamide, triallyl cyanurate, divinylethyleneurea, trimethylolpropane tri(meth)acrylate, trimethylolpropane trivinyl ether, pentaerythritol tetra(meth)acrylate, pentaerythritol tetravinyl ether, and crosslinking agents having two or more different reactive ends, such as, for example, (meth)allyl (meth)acrylates of the formulae:

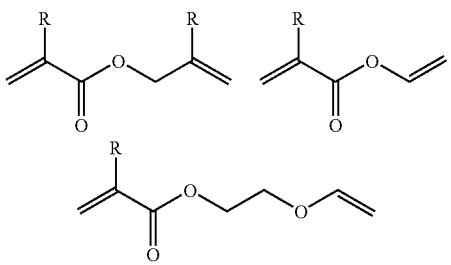

(in which R is hydrogen or methyl).

Group 2: reactive crosslinking agents which act in a crosslinking manner, but in most cases in a post-crosslinking manner, for example during warming or drying, and which are copolymerised into the core or shell polymers as copolymers.

Examples thereof are: N-methylol(meth)acrylamide, acrylamidoglycolic acid, and ethers and/or esters thereof with $C_1$- to $C_6$-alcohols, diacetoneacrylamide (DMM), glycidyl methacrylate (GMA), methacryloyloxypropyltrimethoxysilane (MEMO), vinyltrimethoxysilane and m-isopropenylbenzyl isocyanate (TMI).

Group 3: carboxyl groups which have been incorporated into the polymer by copolymerisation of unsaturated carboxylic acids are crosslinked in a bridge-like manner via polyvalent metal ions. The unsaturated carboxylic acids employed for this purpose are preferably acrylic acid, methacrylic acid, maleic anhydride, itaconic acid and fumaric acid. Suitable metal ions are Mg, Ca, Sr, Ba, Zn, Pb, Fe, Ni, Co, Cr, Cu, Mn, Sn and Cd. Particular preference is given to Ca, Mg and Zn, Ti and Zr. In addition, monovalent metal ions, such as, for example, Na or K, are also suitable.

Group 4: post-crosslinked additives, which are taken to mean bis- or polyfunctionalised additives which react irreversibly with the polymer (by addition or preferably condensation reactions) with formation of a network. Examples thereof are compounds which contain at least two of the following reactive groups per molecule: epoxide, aziridine, isocyanate, acid chloride, carbodiimide or carbonyl groups, furthermore, for example, 3,4-dihydroxyimidazolinone and derivatives thereof (®Fixapret products from BASF).

As already explained above, post-crosslinking agents containing reactive groups, such as, for example, epoxide and isocyanate groups, require complementary reactive groups in the polymer to be crosslinked. Thus, isocyanates react, for example, with alcohols to give urethanes, with amines to give urea derivatives, while epoxides react with these complementary groups to give hydroxyethers and hydroxyamines respectively.

The term post-crosslinking is also taken to mean photochemical curing or oxidative or air- or moisture-induced curing of the systems.

The above-mentioned monomers and crosslinking agents can be combined and (co)polymerised with one another as desired and in a targeted manner in such a way that an optionally crosslinked (co)polymer having the desired refractive index and the requisite stability criteria and mechanical properties is obtained.

It is also possible additionally to copolymerise further common monomers, for example acrylates, methacrylates, vinyl esters, butadiene, ethylene or styrene, in order, for example, to set the glass transition temperature or the mechanical properties of the core and/or shell polymers as needed.

It is likewise preferred in accordance with the invention for the application of the shell of organic polymers to be carried out by grafting, preferably by emulsion polymerisation or ATR polymerisation. The methods and monomers described above can be employed correspondingly here.

In particular on use of inorganic cores, it may also be preferred for the core to be subjected to a pre-treatment which enables binding of the shell before the shell is polymerised on. This can usually consist in chemical functionalisation of the particle surface, as is known from the literature for a very wide variety of inorganic materials. It may particularly preferably involve application to the surface of chemical functions which, as reactive chain end, enable grafting-on of the shell polymers. Examples which may be mentioned in particular here are terminal double bonds, epoxy functions and polycondensable groups. The functionalisation of hydroxyl-carrying surfaces with polymers is disclosed, for example, in EP-A-337 144. Further methods for the modification of particle surfaces are well known to the person skilled in the art and are described, for example, in various textbooks, such as Unger, K. K., Porous Silica, Elsevier Scientific Publishing Company (1979).

The invention furthermore relates to the use of mouldings according to the invention or of core/shell particles according to the invention for the production of pigments. The pigments obtainable in this way are particularly suitable for use in paints, surface coatings, printing inks, plastics, ceramics, glasses and cosmetic formulations. For this purpose, they can also be employed mixed with commercially available pigments, for example inorganic and organic absorption pigments, metal-effect pigments and LC pigments. The particles according to the invention are furthermore also suitable for the production of pigment preparations and for the production of dry preparations, such as, for example, granules. Pigment particles of this type preferably have a platelet-shaped structure with an average particle size of 5 µm-5 mm.

The pigments can be produced, for example, by firstly producing a film from the core/shell particles, which may optionally be cured. The film can subsequently be comminuted in a suitable manner by cutting or crushing and, if desired, subsequent grinding to give pigments of suitable size. This operation can be carried out, for example, in a continuous belt process.

The pigment according to the invention can then be used for the pigmentation of surface coatings, powder coatings, paints, printing inks, plastics and cosmetic formulations, such as, for example, of lipsticks, nail varnishes, cosmetic sticks, compact powders, make-ups, shampoos and loose powders and gels.

The concentration of the pigment in the application system to be pigmented is generally between 0.1 and 70% by weight, preferably between 0.1 and 50% by weight and in particular between 1.0 and 20% by weight, based on the total solids content of the system. It is generally dependent on the specific application. Plastics usually comprise the pigment according to the invention in amounts of from 0.01 to 50% by weight, preferably from 0.01 to 25% by weight, in particular from 0.1 to 7% by weight, based on the plastic composition. In the coatings area, the pigment mixture is employed in amounts of from 0.1 to 30% by weight, preferably from 1 to 10% by weight, based on the coating dispersion. In the pigmentation of binder systems, for example for paints and printing inks for gravure printing, offset printing or screen printing, or as precursor for printing inks, for example in the form of highly pigmented pastes, granules, pellets, etc., pigment mixtures with spherical colorants, such as, for example, $TiO_2$, carbon black, chromium oxide, iron oxide, and organic "coloured pigments", have proven particularly suitable. The pigment is generally incorporated into the printing ink in amounts of 2-35% by weight, preferably 5-25% by weight and in particular 8-20% by weight. Offset printing inks can comprise the pigment in amounts of up to 40% by weight or more. The precursors for printing inks, for example in the form of granules, as pellets, briquettes, etc., comprise up to 95% by weight of the pigment according to the invention in addition to the binder and additives. The invention thus also relates to formulations which comprise the pigment according to the invention.

The following examples are intended to explain the invention in greater detail without limiting it.

EXAMPLES

Abbreviations used:
BDDA butane-1,4-diol diacrylate
SDS dodecyl sulfate sodium salt
SDTH sodium dithionite
APS ammonium peroxodisulfate
KOH potassium hydroxide
ALMA allyl methacrylate
MMA methyl methacrylate
EA ethyl acrylate Example 1

Production of Core/Shell Particles

A mixture, held at 4° C., consisting of 217 g of water, 0.4 g of butanediol diacrylate (Merck, destabilised), 3.6 g of styrene (BASF, destabilised) and 80 mg of sodium dodecylsulfate (SDS; Merck) is introduced into a stirred reactor, pre-heated to 75° C., fitted with propeller stirrer, argon protective-gas inlet and reflux condenser, and dispersed with vigorous stirring. Directly after the introduction, the reaction is initiated by direct successive addition of 50 mg of sodium dithionite (Merck), 250 mg of ammonium peroxodisulfate (Merck) and a further 50 mg of sodium dithionite (Merck), in each case dissolved in 5 g of water. After 10 minutes, a monomer emulsion comprising 6.6 g of butanediol diacrylate (Merck, destabilised), 59.4 g of styrene (BASF, destabilised), 0.3 g of SDS, 0.1 g of KOH and 90 g of water is metered in continuously over a period of 210 minutes. The reactor contents are stirred for 30 minutes without further addition. A second monomer emulsion comprising 3 g of allyl methacrylate (Merck, destabilised), 27 g of methyl methacrylate (BASF, destabilised), 0.15 g of SDS (Merck) and 40 g of water is subsequently metered in continuously over a period of 90 minutes. The reactor contents are subsequently stirred for 30 minutes without further addition. A monomer emulsion comprising 130 g of ethyl acrylate (BASF, destabilised), 139 g of water and 0.33 g of SDS (Merck) is subsequently metered in continuously over a period of 180 minutes. The mixture is subsequently stirred for a further 60 minutes for virtually complete reaction of the monomers. The core/shell particles are subsequently precipitated in 1 l of methanold, 1 l of distilled water is added, and the particles are filtered off with suction and dried.

Scanning and transmission electron photomicrographs of the core/shell particles show that the particles have a particle size of 220 nm.

While carrying out the experiment analogously, the particle size of the particles can be varied via the surfactant concentration in the initially introduced mixture. Selection of corresponding amounts of surfactant gives the following particle sizes:

| Amount of surfactant [mg of SDS] | Particle size [nm] |
|---|---|
| 80 | 220 |
| 90 | 200 |
| 100 | 180 |
| 110 | 160 |

Example 2

Production of Granules of the Core/Shell Particles 3 kg of the core/shell particles from Example 1 are comminuted in a cutting mill (Rapid, model 1528) with ice cooling and subsequently compounded in a single-screw extruder (Plasti-Corder; Brabender; screw diameter 19 mm with 1-hold die (3 mm)). After a cooling zone, the extrudate is granulated in an A 90-5 granulator (Automatik).

Example 3a

Production of a Film from Core/Shell Particles 2 g of the granules from Example 2 are heated to a temperature of 120° C. without pressure in a Collin 300P press and pressed at a pressure of 30 bar to give a film. After cooling to room temperature, the pressure is reduced again.

Figure 2:
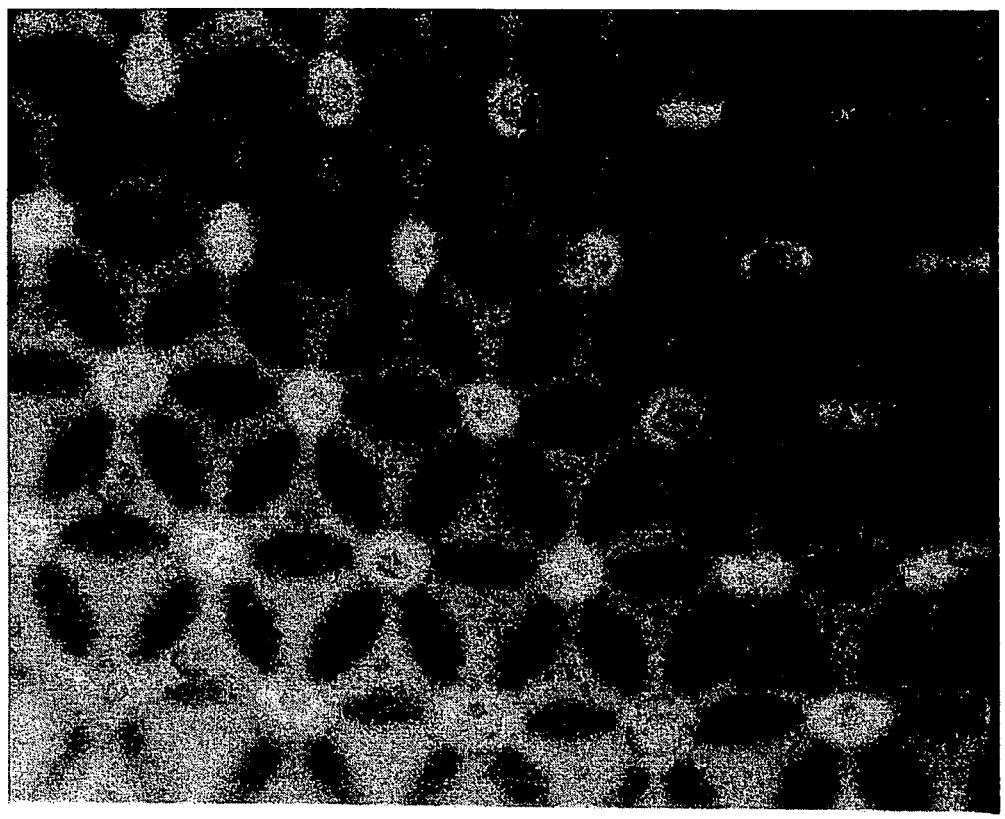
Figure 3:
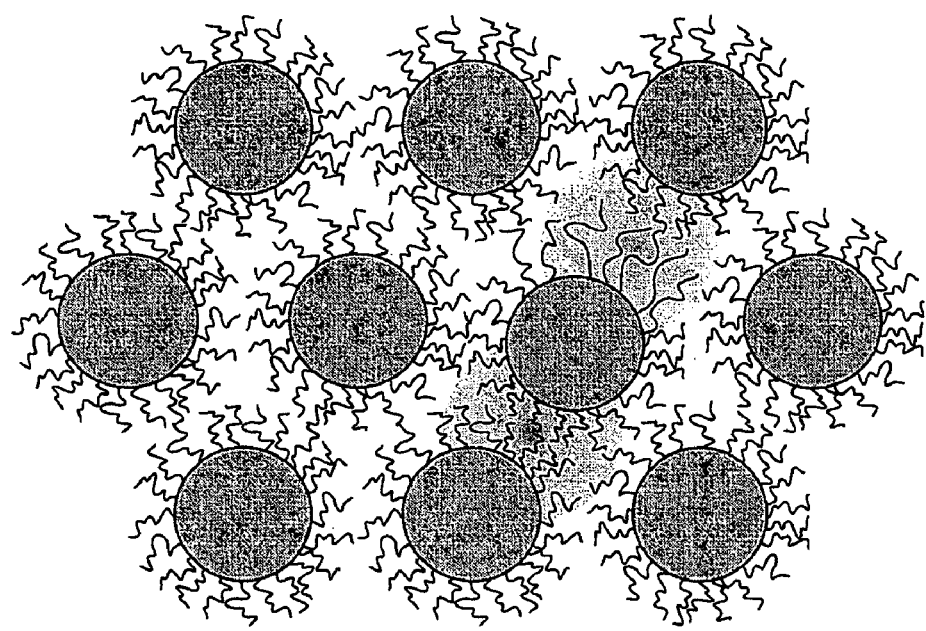

Transmission electron photomicrographs (FIGS. 1 and 2 show particles having a size of 180 nm) confirm the alignment of the cores in the shell matrix to give an extended crystal lattice. FIG. 2 shows the orientation of the three layers of core/shell particles one on top of the other to give an fcc lattice.

Figure 4:
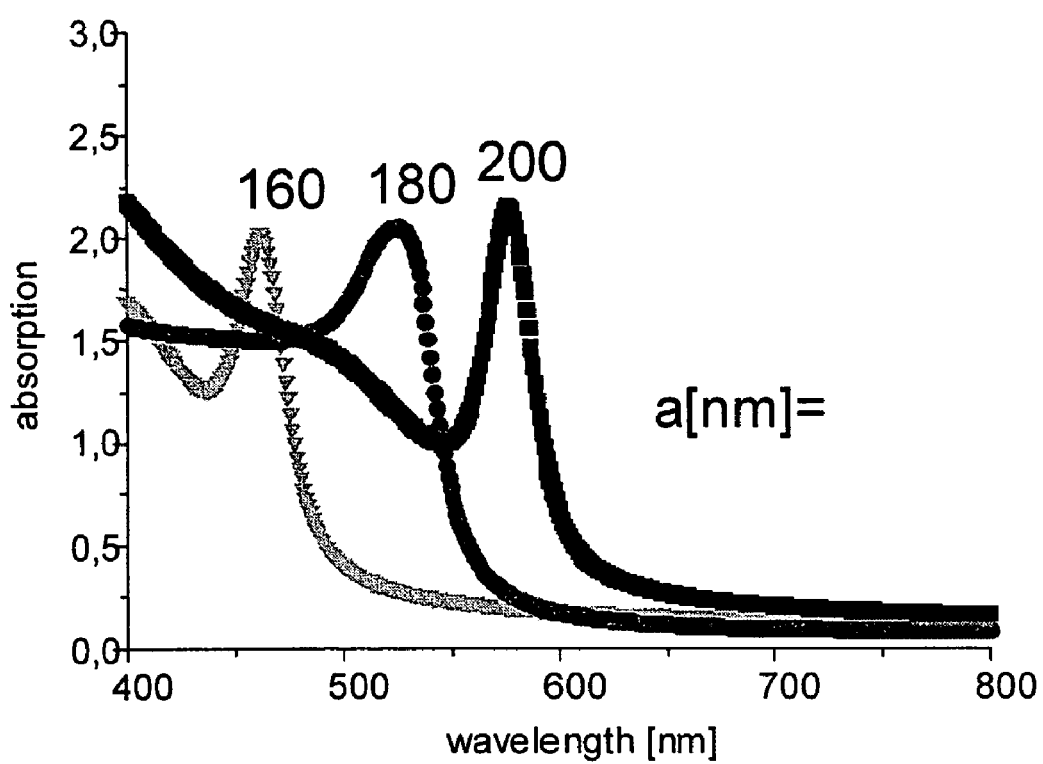
Figure 5:
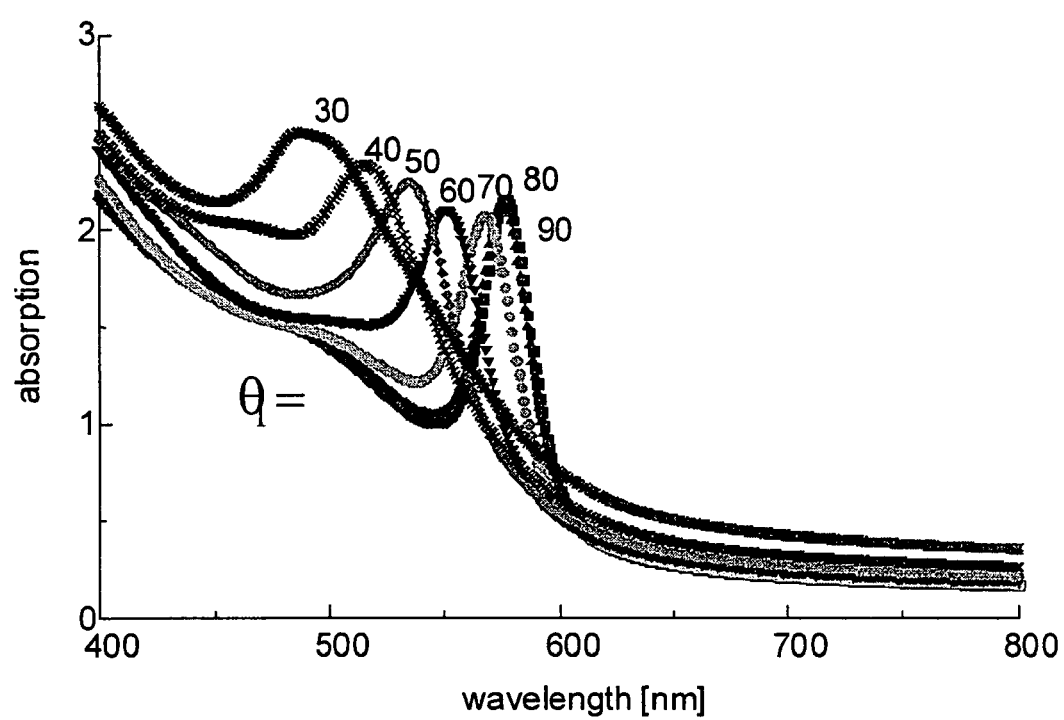

The results of optical absorption spectroscopy (UV/VIS) are shown in FIG. 4 and FIG. 5.

Example 3b

Production of a Film from Core/Shell Particles 25 g of the granules from Example 2 are heated to a temperature of 150° C. without pressure in a press with cartridge cooling system (Dr. Collin GmbH; model 300E) and pressed at a pressure of 250 bar to give a film. After cooling to room temperature, the pressure is reduced again after 8 minutes.

Example 4

Production of Mouldings by Injection Moulding 0.2% by weight of release agent (Ceridust® 3615; Clariant) is admixed with the granules from Example 2. The mixture is processed further using a Klöckner Ferromatik 75 FX 75-2F injection-moulding machine. The granules are injected at 900 bar at a barrel temperature of 190° C. into the mould held at 80° C., subsequently cooled in the mould and demoulded at a mould temperature of 30° C. This gives mouldings having an optical effect which is dependent on the viewing angle.

Example 5

Production of a Flat Film (Tape)

Granules from Example 2 are processed in a flat-film machine consisting of a single-screw extruder (Göttfert; model Extrusiometer; screw diameter 20 mm; L/D 25), a thickness-adjustable film die (width 135 mm) and a heatable polishing stack (Leistritz; roll diameter 15 mm; roll width 350 mm). A film tape with a width of 125 mm and a thickness of 1 mm is obtained.

Example 6

Production of Core/Shell Particles Having a Silicon Dioxide Core (150 nm)

66 g of Monospher® 150 suspension (Merck; solids content 38% by weight, corresponding to 25 g of $SiO_2$ monospheres; average particle size 150 nm; standard deviation of the average particle size <5%) are introduced with 354 g of water into a stirred twin-wall reactor, held at 25° C., fitted with argon protective-gas inlet, reflux condenser and propeller stirrer, a solution of 450 mg of aluminium trichloride hexahydrate (Acros) in 50 ml is added, and the mixture is stirred vigorously for 30 minutes. A solution of 40 mg of sodium dodecylsulfate in 50 g of water is subsequently added, and the mixture is stirred vigorously for a further 30 minutes.

50 mg of sodium dithionite, 150 mg of ammonium peroxodisulfate and a further 50 mg of sodium dithionite, in each case in 5 g of water, are then added directly one after the other. Immediately after the addition, the reactor is heated to 75° C., and 25 g of ethyl acrylate are metered in continuously over a period of 120 minutes. The reactor contents are subsequently stirred at 75° C. for a further 60 minutes for complete reaction of the monomer.

The resultant hybrid material is filtered off and dried and processed further as described in Examples 2 to 5.

Example 6a Core/shell particles having different silicon dioxide core diameters (for example 100 nm) can be produced analogously.

Example 7

Production of Core/Shell Particles Having a Silicon Dioxide Core (250 nm)

60 g of Monospher® 250 (Merck; average particle size 250 nm; standard deviation of the average particle size <5%) are suspended in ethanol. 6 g of 3-methacryloxypropyltrimethoxysilane are added dropwise at 75° C. over the course of 15 minutes with vigorous stirring. After 12 hours at 75° C., the resultant powder is separated off and dried.

90 g of water and 50 mg of sodium dodecylsulfate are added to 10 g of the functionalised Monospher® 250, and the mixture is stirred vigorously for 1 day for dispersal. The suspension is subsequently dispersed in a homogeniser (Niro Soavi, NS1001L). 70 g of water are added to the dispersion, and the mixture is cooled to 4° C.

The dispersion is subsequently introduced into a stirred twin-wall reactor fitted with argon protective-gas inlet, reflux condenser and propeller stirrer. 50 mg of sodium dithionite, 150 mg of ammonium peroxodisulfate and a further 50 mg of sodium dithionite, in each case in 5 g of water, are then added directly one after the other. Immediately after the addition, the reactor is heated to 75° C., and an emulsion of 10 g of ethyl acrylate and 20 g of water is metered in continuously over a period of 120 minutes. The reactor contents are subsequently stirred at 75° C. for a further 60 minutes for complete reaction of the monomer.

The resultant hybrid material is precipitated in a solution of 10 g of calcium chloride and 500 g, of water, filtered off and dried and processed further as described in Examples 2 to 5.

Example 8

Production of Core/Shell Particles in which the Core is Built Up from Silicon Dioxide with an Outer Sheath of Titanium Dioxide 80 g of Monospher®100 (monodisperse silicon dioxide beads having a mean size of 100 nm with a standard deviation of <5%) from Merck KGaA are dispersed in 800 ml of ethanol at 40° C. A freshly prepared solution consisting of 50 g of tetraethyl orthotitanate (Merck KGaA) and 810 ml of ethanol is metered into the Monospher/ethanol dispersion together with deionised water with vigorous stirring. The metering is initially carried out over a period of 5 minutes at a dropwise addition rate of 0.03 ml/min (titanate solution) or 0.72 ml/min. The titanate solution is then added at 0.7 ml/min and the water at 0.03 ml/min until the corresponding containers are completely empty. For further processing, the ethanolic dispersion is stirred under reflux at 70° C. with cooling, and 2 g of methacryloxypropyltrimethoxysilane (ABCR), dissolved in 10 ml of ethanol, are added over a period of 15 minutes. After the mixture has been refluxed overnight, the resultant powder is separated off and dried. 90 g of water and 50 mg of sodium dodecylsulfate are added to 10 g of the functionalised silicon dioxide/titanium dioxide hybrid particles, and the mixture is stirred vigorously for 1 day for dispersal. The suspension is subsequently dispersed in a homogeniser (Niro Soavi, NS1001L). 70 g of water are added to the dispersion, and the mixture is cooled to 4° C.

The dispersion is subsequently introduced into a stirred twin-wall reactor with argon protective-gas inlet, reflux condenser and propeller stirrer. 50 mg of sodium dithionite, 150 mg of ammonium peroxodisulfate and a further 50 mg of sodium dithionite, in each case in 5 g of water, are then added directly one after the other. Immediately after the addition, the reactor is heated to 75° C., and an emulsion of 10 g of ethyl acrylate and 20 g of water is metered in continuously over a period of 120 minutes. The reactor contents are subsequently stirred at 75° C. for a further 60 minutes for complete reaction of the monomer.

The resultant hybrid material is precipitated in a solution of 10 g of calcium chloride and 500 g of water, filtered off and dried and processed further as described in Examples 2 to 5.

Example 9

Production of Core/Shell Particles in a 5 l Reactor

A mixture, held at 4° C., consisting of 1519 g of deionised water, 2.8 g of BDDA, 25.2 g of styrene and 1030 mg of SDS is introduced into a 5 l jacketed reactor, heated to 75° C., fitted with double-propeller stirrer, argon protective-gas inlet and reflux condenser, and dispersed with vigorous stirring. The reaction is immediately initiated by successive injection of 350 mg of SDTH, 1.75 g of APS and a further 350 mg of SDTH, in each case dissolved in about 20 ml of water. The injection is carried out by means of disposable syringes. After 20 minutes, a monomer emulsion comprising 56.7 g of BDDA, 510.3 g of styrene, 2.625 g of SDS, 0.7 g of KOH and 770 g of water is metered in continuously over a period of 120 minutes via a rotary piston pump. The reactor contents are stirred for 30 minutes without further addition. A second monomer emulsion comprising 10.5 g of ALMA, 94.50 g of methyl methacrylate, 0.525 g of SDS and 140 g of water is subsequently metered in continuously over a period of 30 minutes via the rotary piston pump. After about 15 minutes, 350 mg of APS are added, and the mixture is then stirred for a further 15 minutes. A third monomer emulsion comprising 900 g of EA, 2.475 g of SDS and 900 g of water is then metered in continuously over a period of 240 minutes via the rotary piston pump. The mixture is subsequently stirred for a further 120 minutes. Before and after each initially introduced mixture change, argon is passed in for about half a minute. Next day, the reactor is heated to 95° C., and a steam distillation is carried out. The core/shell particles are subsequently precipitated in 4 l of ethanol, washed with 5% calcium chloride solution, filtered off and dried and processed further as described in Examples 2 to 5. Mouldings having a colour effect (colour flop) in the red-green region are obtained.

Example 10

Production of Core/Shell Particles Having a Butyl Acrylate Shell

A mixture, held at 4° C., consisting of 217 g of water, 0.4 g of butanediol diacrylate (Merck, destabilised), 3.6 g of styrene (BASF, destabilised) and 80 mg of sodium dodecylsulfate (SDS; Merck) is introduced into a stirred reactor, pre-heated to 75° C., fitted with propeller stirrer, argon protective-gas inlet and reflux condenser, and dispersed with vigorous stirring. Immediately after the introduction, the reaction is initiated by direct successive addition of 50 mg of sodium dithionite (Merck), 250 mg of ammonium peroxodisulfate (Merck) and a further 50 mg of sodium dithionite (Merck), in each case dissolved in 5 g of water. After 10 minutes, a monomer emulsion comprising 6.6 g of butanediol diacrylate (Merck, destabilised), 59.4 g of styrene (BASF, destabilised), 0.3 g of SDS, 0.1 g of KOH and 90 g of water is metered in continuously over a period of 210 minutes. The reactor contents are stirred for 30 minutes without further addition. A second monomer emulsion comprising 3 g of allyl methacrylate (Merck, destabilised), 27 g of methyl methacrylate (BASF, destabilised), 0.15 g of SDS (Merck) and 40 g of water is subsequently metered in continuously over a period of 90 minutes. The reactor contents are subsequently stirred for 30 minutes without further addition. A monomer emulsion comprising 130 g of butyl acrylate (Merck, destabilised), 139 g of water and 0.33 g of SDS (Merck) is subsequently metered in continuously over a period of 180 minutes. The mixture is subsequently stirred for a further 60 minutes for virtually complete reaction of the monomers. The core/shell particles are subsequently precipitated in 1 l of methanol, 1 l of distilled water is added, and the particles are filtered off with suction, dried and processed further as described in Examples 2 to 5.

Example 11

Production of Core/Shell Particles Having an Ethyl Acrylate/butyl Acrylate Shell A mixture, held at 4° C., consisting of 217 g of water, 0.4 g of butanediol diacrylate (Merck, destabilised), 3.6 g of styrene (BASF, destabilised) and 60 mg of sodium dodecylsulfate (SDS; Merck) is introduced into a stirred reactor, pre-heated to 75° C., fitted with propeller stirrer, argon protective-gas inlet and reflux condenser, and dispersed with vigorous stirring. Immediately after the introduction, the reaction is initiated by direct successive addition of 50 mg of sodium dithionite (Merck), 300 mg of ammonium peroxodisulfate (Merck) and a further 50 mg of sodium dithionite (Merck), in each case dissolved in 5 g of water. After 10 minutes, a monomer emulsion comprising 8.1 g of butanediol diacrylate (Merck, destabilised), 72.9 g of styrene (BASF, destabilised), 0.375 g of SDS, 0.1 g of KOH and 110 g of water is metered in continuously over a period of 150 minutes. The reactor contents are stirred for 30 minutes without further addition. A second monomer emulsion comprising 1.5 g of allyl methacrylate (Merck, destabilised), 13.5 g of methyl methacrylate (BASF, destabilised), 0.075 g of SDS (Merck) and 20 g of water is subsequently metered in continuously over a period of 45 minutes. The reactor contents are subsequently stirred for 30 minutes without further addition. 50 mg of APS dissolved in 5 g of water are subsequently added. A monomer emulsion comprising 59.4 g of ethyl acrylate (Merck, destabilised), 59.4 g of butyl acrylate, 1.2 g of acrylic acid, 120 g of water and 0.33 g of SDS (Merck) is subsequently metered in continuously over a period of 240 minutes. The mixture is subsequently stirred for a further 60 minutes for virtually complete reaction of the monomers. The core/shell particles are subsequently precipitated in 1 l of methanol, 1 l of distilled water is added, and the particles are filtered off with suction and dried and processed further as described in Examples 2 to 5.

FIGURES

FIG. 1: Transmission electron photomicrograph of a section through a film with a thickness of 1 mm produced as described in Example 3a (particle size 180 nm).

FIG. 2: Transmission electron photomicrograph of the plan view of a film produced as described in Example 3a (particle size 180 nm). Three layers of core/shell particles one on top of the other can be seen.

FIG. 3: Model of the crystallisation mechanism; rubber elasticity of the shell.

FIG. 4: Absorption spectra of various films comprising core/shell particles (as described in Example 3a);
  a: average particle separation [nm]

FIG. 5: Absorption spectra of a film comprising core/shell particles (as described in Example 3a; average particle separation=200 nm) as a function of the angle θ between the film surface and the incident light beam.

The invention claimed is:

1. A molded article having an optical effect, essentially consisting of core/shell particles whose shell forms a matrix and whose core is essentially solid and has an essentially monodisperse size distribution, where a difference exists between the refractive indices of the core material and of the shell material, and the shell is bonded to the core via an interlayer and the shell material is filmable, which molded article is obtainable by a process in which
a) the core/shell particles are heated to a temperature at which the shell is flowable, and
b) the flowable core/shell particles from a) are subjected to the action of a mechanical force.

2. A molded article according to claim 1, wherein the core consists of a material which is either not flowable or becomes flowable at a temperature above the melting point of the shell material.

3. A molded article according to claim 1, which is obtainable by a process in which the temperature in step a) is at least 40° C. above the glass transition temperature of the shell.

4. A molded article according to claim 1, which is obtainable by a process in which the temperature in step a) is at least 60° C. above the glass transition temperature of the shell.

5. A molded article according to claim 1, which is obtainable by a process in which
c) the core/shell particles are cooled under the action of the mechanical force from b) to a temperature at which the shell is no longer flowable.

6. A molded article according to claim 1, wherein the action of mechanical force takes place through uniaxial pressing.

7. A molded article according to claim 6, wherein the molded article is a film.

8. A molded article according to claim 1, wherein the action of mechanical force takes place during an injection-molding operation in an injection mold.

9. A molded article according to claim 8, wherein the injection mold has a large cooling-channel cross section.

10. A molded article according to claim 1, wherein the action of mechanical force takes place during extrusion.

11. A molded article according to claim 1, which consists of at least 60% by weight of core/shell particles.

12. A molded article according to claim 1, which consists of at least 80% by weight of core/shell particles.

13. A molded article according to claim 1, which consists of at least 95% by weight of core/shell particles.

14. A molded article according to claim 1, wherein the core/shell particles have a mean particle diameter in the range of about 5 nm to about 2000 nm.

15. A molded article according to claim 1, wherein the core/shell particles have a mean particle diameter in the range of about 5 nm to 20 nm.

16. A molded article according to claim 1, wherein the core/shell particles have a mean particle diameter in the range of about 50 nm to 500 nm.

17. A molded article according to claim 1, wherein the difference between the refractive indices of the core material and of the shell material is at least 0.001.

18. A molded article according to claim 1, wherein the difference between the refractive indices of the core material and of the shell material is at least 0.01.

19. A molded article according to claim 1, wherein the difference between the refractive indices of the core material and of the shell material is at least 0.1.

20. A molded article according to claim 1, further containing in the matrix nanoparticles, inorganic nanoparticles, nanoparticles of a metal, of gold, or of a II-VI or III-V semiconductor, of zinc sulfide or of gallium arsenide, nanoparticles of a metal of a II-VI or III-V semiconductor or of a material that influences the magnetic/electrical (electronic) properties of the materials, of noble metals, of silver, of platinum, of a semiconductor, of an insulator, of a zinc chalcogenide or cadmium chalcogenide, an oxide, of haematite, of magnetite, of perovskite, of a metal pnictide, of gallium nitride, or a mixed phase thereof.

21. A molded article according to claim 1, wherein the shell is a polymer comprising butylacrylate units.

22. A molded article according to claim 1, which is adapted for use as a pigment.

23. A molded article according to claim 1, wherein the molded article is a film.

24. A molded article according to claim 1, which has a platelet shaped structure with an average particle size of 5 µm to 5 mm.

25. A molded article according to claim 24, which is added to a paint, surface coating, printing ink, plastic article or composition, ceramic article or composition, a glass article or composition, or cosmetic formulation.

26. A process for preparing a molded article having an optical effect according to claim 1, comprising
a) heating the core/shell particles to a temperature at which the shell is flowable, and
b) subjecting the flowable core/shell particles from a) to a mechanical force.

27. A process according to claim 26, further comprising
c) cooling the core/shell particles under the action of the shear force from b) to a temperature at which the shell is no longer flowable.

28. A process according to claim 26, wherein the action of mechanical force takes place during an injection-molding operation in an injection mold that optionally has a large cooling-channel cross section.

29. A process according to claim 26, wherein the molded article is a film.

30. A process according to claim 29, further comprising comminuting, cutting, crushing or grinding the film to obtain particles having an average particle size of 5 µm to 5 mm.

* * * * *